Feb. 24, 1942.   G. B. MARZOLF   2,274,077
LEG CONNECTION
Filed April 1, 1940
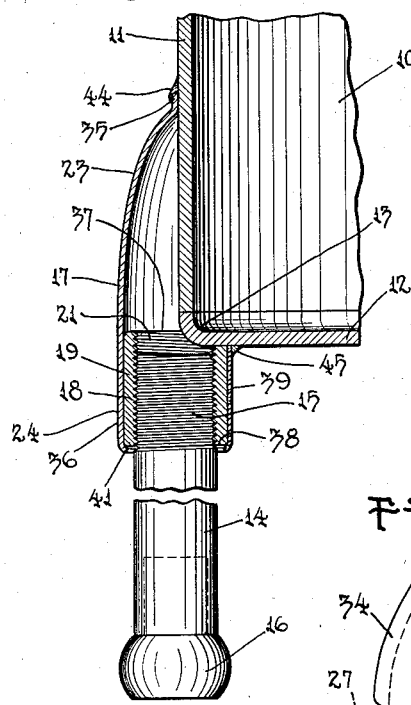
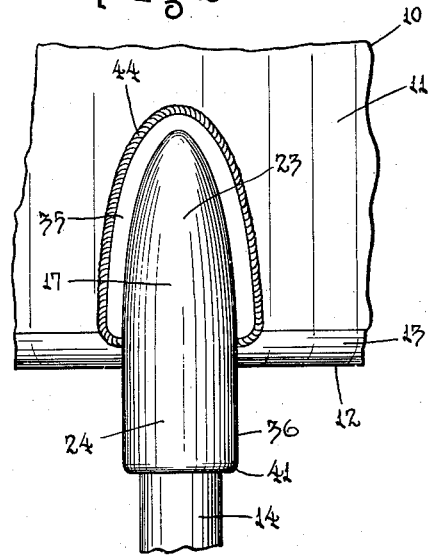
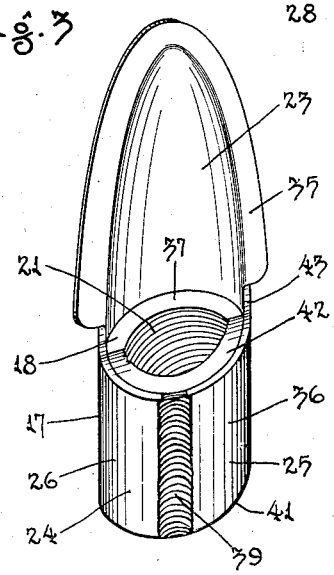
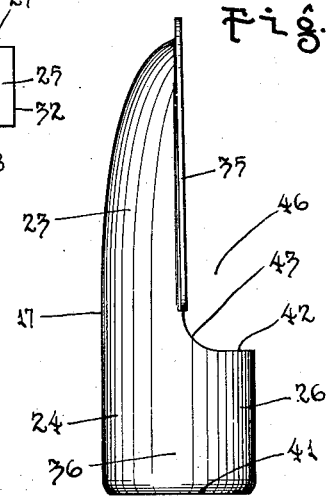
Inventor
George B. Marzolf
By Caswell & Lagaard
Attorneys Patented Feb. 24, 1942

2,274,077

UNITED STATES PATENT OFFICE 2,274,077

LEG CONNECTION

George B. Marzolf, St. Paul, Minn., assignor to Farwell Ozmun Kirk & Co., St. Paul, Minn., a corporation of Minnesota Application April 1, 1940, Serial No. 327,274

6 Claims. (Cl. 248—151)

My invention relates to connections for connecting legs to tanks and to other objects supported on legs, and has for an object to provide an extremely simple and practical construction for the purpose.

An object of the invention resides in providing a leg connection which will be neat, sanitary and attractive in appearance.

Another object of the invention resides in providing a leg connection which may be finished smooth with reference to the surface to which it is attached and without sharp corners or crevices in which foreign material may lodge.

Another object of the invention resides in constructing the leg connection with an elongated shell having a rabbet formed therein for the reception of the corner of the tank or other object to be supported by the connection.

A feature of the invention resides in constructing the upper body portion of the shell with a flange extending about the edges thereof and adapted to be welded or riveted, bolted or screwed to a side wall of a tank or other object to be supported.

An object of the invention resides in constructing the lower body portion of the shell in the form of a sleeve having a seat formed thereon on which the bottom of the tank or other object rests.

A still further object of the invention resides in disposing within said sleeve a coupling for attachment to a leg.

A feature of the invention resides in constructing the shell from a sheet metal blank having a substantially semielliptical upper body portion and a lower body portion with wings extending outwardly therefrom in the direction of and in proximity to the minor axis of the upper body portion.

An object of the invention resides in the method of making the leg connection which consists in forming the upper body portion in cuplike formation, and the lower body portion and wings cylindrical in form with the edges of the ends of the wings spaced from one another to provide a slotted sleeve at the lowermost portion of the shell.

Another object of the invention resides in providing a leg connection in which the coupling is attached to the shell by means of a weld extending along the spaced edges of the wings and in the slot of the sleeve.

A still further object of the invention resides in providing a leg connection in which a lip is turned inwardly from the lowermost edge of the sleeve to engage the lowermost end of the coupling.

Another object of the invention resides in providing a leg connection in which the upper edge of the coupling and the upper edges of the sleeve formed by the wings, are at the same elevation to provide a seat upon which the bottom of the tank or other object is adapted to rest.

Other objects of the invention reside in the novel combination and arrangement of parts and in the details of construction hereinafter illustrated and/or described.

In the drawing:

Fig. 1 is an elevational sectional view of a portion of a tank, a leg therefor, and a leg connection illustrating an embodiment of my invention.

Fig. 2 is an elevational view of the structure shown in Fig. 1.

Fig. 3 is a detail perspective view of the leg connection shown in Figs. 1 and 2.

Fig. 4 is a side elevational view of the structure shown in Fig. 3.

Fig. 5 is a developed view of the blank from which the shell of the leg connection is constructed.

In supporting tanks and other objects of various kinds it frequently becomes desirable to raise such objects above the floor or other supporting medium by means of legs or otherwise. The instant invention provides a leg connection which may be permanently or removably attached to a tank or other object and to which the legs may be secured when the tank is to be supported in elevated position.

For the purpose of illustrating the invention I have shown in Figs. 1 and 2 a portion of a tank 10. This tank comprises a circumferentially extending wall 11 and a bottom 12 connected therewith. The bottom 12 is provided with a rounded corner 13 which forms a fillet between the bottom proper and the circumferential wall. It can readily be comprehended however, that the tank shown is merely illustrative and that the invention may be utilized with any type of construction and with objects other than tanks.

For supporting the tank a number of legs 14 are employed which are preferably tubular in form. The leg 14 is threaded at its upper end, as indicated at 15, and the lower end of the leg has a foot 16 attached to the same.

My improved leg connection comprises a shell 17 constructed of sheet metal which has a coupling or attaching member 18 secured thereto and to which the leg 14 is attached.

The coupling 18 is in the nature of a pipe fitting and consists of a cylindrical tubular wall structure 19 threaded at 21 to receive the threaded end 15 of the leg 14. This coupling may be made by threading heavy tubular stock or the same may be constructed in any other suitable manner.

The shell 17 is formed from a blank 22 shown in developed form in Fig. 5. This blank consists of an upper body portion 23 which is substantially semi-elliptical in form and a lower body portion 24 disposed beneath the same. The lower body portion 24 has issuing laterally from it two wings 25 and 26 which are substantially rectangular in form and which have upper edges 27 lying in alignment and lower edges 28 which are disposed in continuance of the lower edge 29 of the lower body portion 24. The wings 25 and 26 also have end edges 31 and 32. The marginal portion 34 of the upper body portion 23 serves a purpose which will be presently more fully described.

The shell 17 is constructed by stamping the blank 22 and forming the upper body portion 23 substantially semi-ellipsoidal in form and in forming the lower body portion 24 semi-cylindrical in form. At the same time a flange 35 is formed from the marginal portion 34 of the body portion 23, which flange is disposed in a surface conforming with the surface of the wall 11 of the tank 10 with which the connection is to be used. Where the connection is to be used with a tank having flat walls, the flange 35 lies in a single plane. If the connection is to be used with a tank having cylindrical walls, the flange 35 is disposed in the surface of the cylinder so that the same fits snugly upon the surface of the tank or other object to which it is to be attached. The wings 25 and 26 are bent into circular form to form in conjunction with the body portion 24 a tubular structure forming a sleeve at the lowermost portion of the body portion 23, which I have designated by the reference numeral 36. This sleeve is of the same diameter as the upper body portion 23 at the minor axis thereof and lies in continuation of said body portion so that the two parts merge into one another and form a smooth and uniformly converging structure, pleasing in appearance and without unnecessary corners or other irregularities tending to impair sanitation. The length of the wings 25 and 26 is such that the said wings fall short of one another, as shown in Fig. 3, when the same are brought together to form the sleeve 36. By means of the construction described a recess or rabbet 46 is formed in the shell 17 for the reception of the lowermost portion of the tank 10. The body portion 23, when the connection is applied to the tank, serves as a brace to stiffen the connection and hold the leg in place.

The coupling 18 is of such dimensions as to be snugly received within the sleeve 36 and is of a length slightly shorter than the height of the wings 25 and 26. This coupling is disposed with its upper edge 37 in proximity to the upper edges 27 of the wings 25 and 26 and with its lower edge 38 situated above the edges 28 and 29 of the parts forming the sleeve 36.

Upon insertion of the coupling 18 into the sleeve 36 the edges 31 and 32 of wings 25 and 26 are welded together and to the wall structure 19 of the coupling by a weld 39 which fills the space between said edges 31 and 32 of said wings. Subsequently, the outer surface of the sleeve 36 is ground smooth, whereby the joint formed by the weld 39 between sleeve and coupling will be practically invisible. In thus welding the tips of the wings 25 and 26 together and to the coupling 18, the sleeve 36 is caused to be shrunk around the coupling, whereby rigidness of attachment of said sleeve to said coupling is effected not only at the weld 39, but throughout the contacting surfaces of said sleeve and coupling.

After the coupling 18 has been inserted into the sleeve 36, and welded thereto, the lower marginal portion 41 of the sleeve 36, at the lowermost edges thereof, is turned inwardly to form a lip adapted to engage the lower edge 38 of coupling 18. This removes sharp corners from the shell 17 and encloses and conceals the lower edge of the coupling 18, thus making it unnecessary to grind or otherwise finish the lowermost portion of the leg connection.

As a final step in completing the leg connection the upper edge 37 of the coupling and the upper edges 27 of the wings 25 and 26 are simultaneously ground by suitable grinding wheels to produce a seat 42 on which the bottom 12 of the tank 10 is adapted to rest. This seat is provided with a fillet 43 which fits the rounded corner 13 of the tank 10. By means of the seat 42 the tank is caused to rest directly upon the coupling 18, as well as the sleeve 36, whereby the stresses between said two parts is eliminated so that the weld 39 is without stress as far as carrying the load of the tank is concerned.

In attaching the leg connection to the tank, the formed structure shown in Fig. 3 is applied to the tank, as illustrated in Figs. 1 and 2. The marginal portions of the flange 35 are then welded directly to the tank by means of a weld 44 which extends throughout the entire extent of the said flange. The weld 44 is continued around the seat 42, as indicated at 45, so that the entire edge of the leg connection contacting with the tank is welded thereto. The welds 44 and 45 and a marginal portion of the flange 35 may, after welding, be ground down to form a smooth joint between the shell 17 and the tank. In this manner, the leg connection is securely attached to the tank, so as to form, in effect, an integral part thereof and without pronounced seams or joints.

While the above-described welds 44 and 45 will be desirable in many cases in the installation of my improved leg connection, it will be readily comprehended that such welds may be omitted and that the flange 35 of the shell may be bolted, riveted, screwed or otherwise suitably attached to the tank, table, bin, platform or other object to which the leg connection is to be applied.

In the use of the invention, it merely becomes necessary to screw the threaded ends 15 of legs 14 into the couplings 18 of the leg connections. Adjustment of the height of the legs can, of course, be procured by varying the depth of the entry of the threaded ends 15 of the legs 14 into the couplings 18.

The advantages of my invention are manifest. By means of the flange utilized in connection with the upper body portion of the shell, the shell may be easily secured to a tank or similar object. In securing the shell to an object, said shell may be readily welded to such object and expeditiously ground to provide a smooth joint. My invention permits of constructing the leg connection of sheet metal which is particularly advantageous where a connection is desired of a more expensive material to be connected to an object of like material. In various industries, and particularly industries where foods are prepared and handled, it becomes desirable to construct tanks and other structures with which the invention is adapted to be used from stainless steel and various corrosion-resisting alloy metals. My invention, in such cases, is highly advantageous in that the shell can be constructed of sheet material of the same metal or alloy. It thus becomes unnecessary to attempt to cast leg connections from metals, which, in some instances, are not adaptable for casting. My improved leg connection is attractive in appearance and is simple in construction and highly practical in use.

Changes in the specific form of my invention, as herein disclosed, may be made within the scope of what is claimed without departing from the spirit of my invention.

Having described my invention, what I claim as new and desire to protect by Letters Patent is:

1. A leg connection comprising a hollow shell having an upper body portion substantially semi-ellipsoidal in form, and a lower body portion with wings issuing therefrom substantially cylindrical in form to provide a sleeve, a cylindrical coupling disposed within said sleeve, the ends of said wings being spaced from one another and a weld extending along the facing edges of said wings for attaching the sleeve to the coupling.

2. A leg connection comprising a shell having an upper brace portion of cupped formation for attachment to an object to be supported and having a lower portion with wings issuing therefrom substantially cylindrical in form to provide a sleeve, a cylindrical coupling disposed within said sleeve, the upper edge of said coupling being at the same elevation as the upper edges of said wings to provide a seat on which the object to be supported rests, whereby the weight of the object is carried partly by the sleeve and partly by the coupling.

3. A leg connection comprising a hollow shell having an upper body portion substantially semi-ellipsoidal in form, and a lower body portion with wings issuing therefrom substantially cylindrical in form to provide a sleeve, a cylindrical coupling disposed within said sleeve, the lower end of said coupling being situated inwardly of the lower edge of said sleeve and a lip formed on the lower edge of said sleeve and extending inwardly to engage the lower end of the coupling.

4. A connection comprising an elongated shell-like body formed from a single piece of sheet material, both end portions of said body being curved laterally thereof, one end portion being additionally curved at its extremity longitudinally of said body and providing a cupped member for marginal attachment to an object, the other end portion of said body having wing members at the sides thereof bent in continuation of its lateral curvature and providing a split sleeve, a tubular coupling arranged concentrically of said sleeve, and a weld joining the extremities of said wing members to each other and to said tubular coupling.

5. A leg connection comprising an elongated shell-like body formed from a single piece of sheet material, both end portions of said body being curved laterally thereof, one end portion providing a dished brace member for marginal attachment to an object to be supported, the other end portion of said body having wing members at the sides thereof bent in continuation of its lateral curvature and providing a split sleeve, a coupling member disposed within said sleeve for connection with a supporting leg, and a weld uniting the extremities of said wing members and rendering said sleeve annularly continuous, said sleeve being shrunk about the coupling member firmly to secure said member within said sleeve.

6. A leg connection comprising an elongated shell-like body formed from a single piece of sheet material, both end portions of said body being curved laterally thereof, one end portion being additionally curved at its extremity longitudinally of said body and providing a cupped member, the same having a marginal flange at its sides and tip conforming with the surface of and adapted to be attached to an object to be supported, the other end portion of said body having wing members at the sides thereof bent in continuation of its lateral curvature and providing a split sleeve, a tubular coupling disposed within said sleeve for the reception of a supporting leg, and a weld joining the extremities of said wing members to each other and to said tubular coupling.

GEORGE B. MARZOLF.